June 19, 1951  B. FISK ET AL  2,557,086

ELECTRONIC COMMUTATOR CIRCUIT

Filed July 5, 1949  3 Sheets-Sheet 3

| | 31 | 30 | 32 | 33 | 34 | 35 | 36 |
|---|---|---|---|---|---|---|---|
| START | B | B | B | B | B | B | B |
| 1 | A | A | | A | | | |
| 2 | B | | A | | | A | |
| 3 | A | B | | | A | | |
| 4 | B | (A) | B | (B) | | | A |
| 5 | A | B | | (A) | B | | |
| 6 | B | | A | | (A) | B | |
| 7 | A | A | | B | | | |
| 8 | B | | B | | | (A) | B |
| 9 | A | B | | (A) | B | | |
| 10 | B | | A | | (A) | B | |
| 11 | A | A | | B | | | |
| 12 | B | | B | | | A | |
| 13 | A | B | | (A) | B | | |
| 14 | B | | A | | | A | |
| 15 | A | A | | B | | | |
| 16 | B | | B | | | | B |
| 17 | A | B | | | A | | |
| 18 | B | | A | | | B | |
| 19 | A | A | | A | | | |
| 20 | B | | B | | | | A |
| 21 | A | B | | | B | | |
| 22 | B | | A | | | A | |
| 23 | A | A | | B | | | |
| 24 | B | | B | | | | B |
| 25 | A | B | | | A | | |

FIG. 3

Inventors
BERT FISK
CHARLES L. SPENCER

By

M. O. Hayes

ATTORNEY

Patented June 19, 1951

2,557,086

UNITED STATES PATENT OFFICE 2,557,086

ELECTRONIC COMMUTATOR CIRCUIT

Bert Fisk and Charles L. Spencer,
Washington, D. C.

Application July 5, 1949, Serial No. 103,142

4 Claims. (Cl. 250—27)

(Granted under the act of March 3, 1883, as
amended April 30, 1928; 370 O. G. 757)

This invention relates to electronic commutation devices in general and in particular to a novel circuit of high stability employing inter connected highly stable trigger circuits.

In numerous instances of electric signal operative devices, time sharing or sequencing of operation is employed. A typical application is a multiple pulse signalling system wherein is produced pulses of energy at specific instants of time to convey intelligence relative to a plurality of variable quantities. Ordered selection of these variable quantities for sampling and operation in a regular sequence is normally provided by some form of commutator for which the apparatus of the present invention is well suited.

It is therefore an object of the present invention to provide an electric commutator possessive of a high degree of stability of operation.

Another object of the present invention is to provide an electronic commutator circuit which produces a series of separately contained signals in ordered sequence.

Other and further objects and features will become apparent upon a careful consideration of the accompanying description and drawing in which Fig. 1 is a block diagram showing in general the basic organization of the present invention.

Fig. 3 shows cycles of operation of the circuit of Fig. 1 resultant to input signals.

In accordance with the fundamental concepts of the present invention, an electronic commutator circuit is provided in which several groups of inter-connected highly-stable trigger circuits are employed to receive a series of timing signals. The signals are contained in a single line and supplied to a first group having one trigger circuit and provide sequential output in separate lines from a last group having an even number of trigger circuits. The total number of available output signals is equal to twice the number of trigger circuits in the last group. The number of trigger circuits in each group is determined according to a geometric progression, the first group having one trigger circuit; the second, two trigger circuits; the third, four trigger circuits; a possible fourth, not shown having eight trigger circuits and so on increasing in multiples of two for each group.

Figure 1:
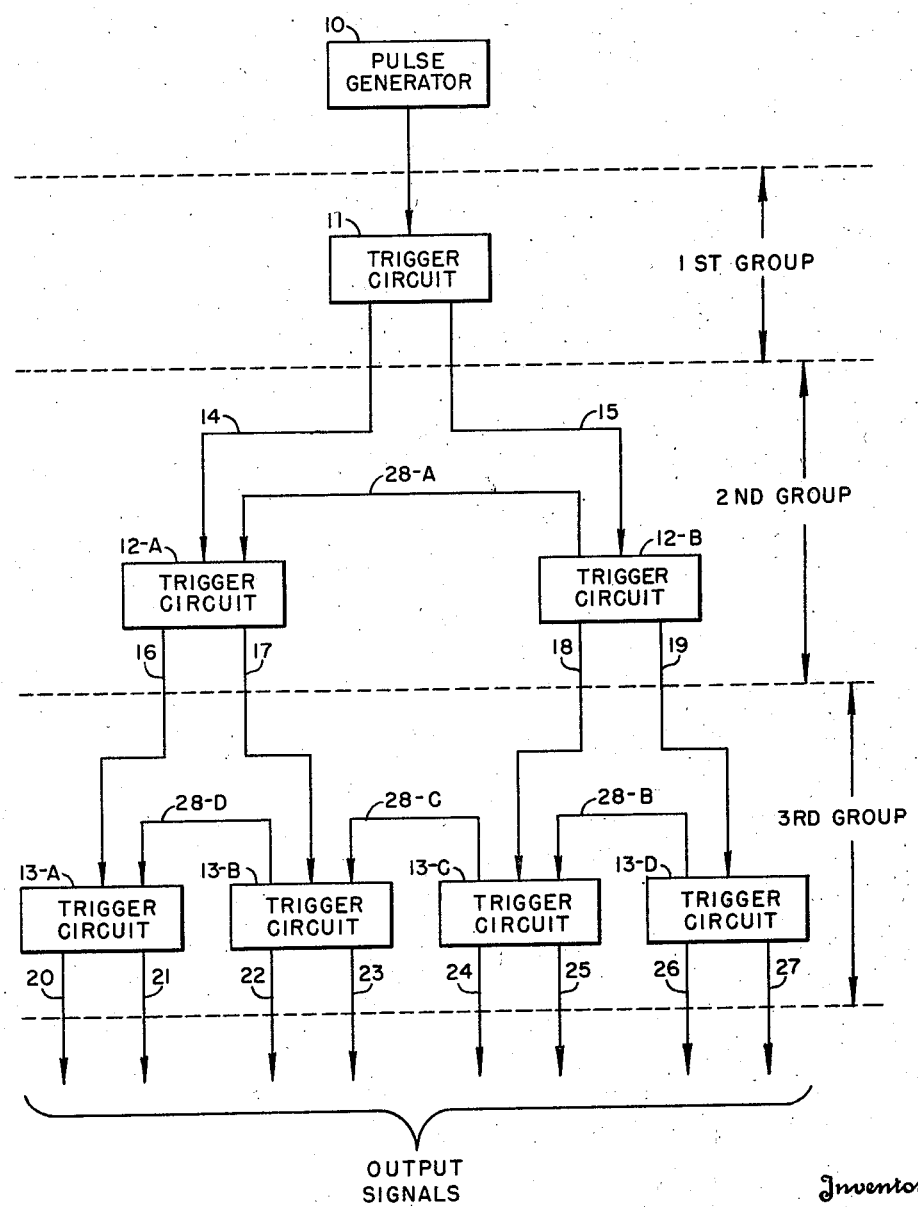

With particular reference to Fig. 1 of the drawing the block diagram shown therein contains an input pulse source designated as pulse generator 10 which is possessive, for example, of a high degree of stability of operation producing typically pulses of short duration at one milli-second intervals. Pulse generator 10, it will be understood is simply representative of any suitable signal source having either a regular or irregular recurrent output. In the simplest form these pulses may be of a typical negative polarity. Responsive to the output pulses from pulse generator 10 is a first trigger circuit 11 which alone is the component of the previously mentioned first group. This trigger circuit 11 is of a type possessive of two stable conductivity states either of which may exist indefinitely being terminated only upon application of input negative pulse signals. Either state may be realized following the previously existing state in response to a negative pulse. The trigger circuit 11 has two output connections. At each of these connections and in an alternate manner is produced a negative signal upon operation of the trigger circuit 11 responsive to the pulses from pulse generator 10. Thus in a first line 14 a negative signal will appear in coincidence with a first pulse from pulse generator 10. Similarly a negative signal will be produced in line 15, the other output from trigger circuit 11, responsive to a second pulse from pulse generator 10. It is thus seen that negative signals in either line 14 or 15 will occur at half the frequency of the output pulses from pulse generator 10.

The lines 14 and 15 are connected independently to separate trigger circuits 12A and 12B which together form the second group of trigger circuits. For all practical purposes trigger circuits 12A and 12B are identical in all respects to trigger circuit 11. Trigger circuits 12A and 12B respond to negative input pulses in the same manner as trigger circuit 11 to produce output negative signals in lines 16, 17, 18 and 19.

The negative output signals in lines 16, 17, 18 and 19 will not occur in coincidence. Each signal will be separate although not necessarily in numerical sequence. Each signal will be repeated in each line at four milli-second intervals.

Where it is desired to obtain a greater number of sequential output signals as for example, eight, a third group of trigger circuits containing the independent trigger circuits 13A, 13B, 13C, and 13D is employed. Following the same method of connection and operation previously outlined, trigger circuits 13A and 13B are set up in such a manner that they are responsive to negative output signals in lines 16 and 17 from trigger circuit 12A. Similarly trigger circuits 13C and 13D are responsive to negative output signals in lines 18 and 19 from trigger circuit 12B. Thus is obtained in the output circuits indicated by the numerals 20 through 27, sequential negative output signals which will recur in each line every eight milli-seconds.

To insure that the trigger circuits all maintain operation in such a manner that only one of the output trigger circuits 13A, 13B, 13C and 13D operate at any given instant, several corrective signal paths identified by the numerals 28A, 28B, 28C and 28D are provided. In the normal course of operation these corrective circuits are ineffective delivering signals of such polarity at such instants of time that they are ineffective. If for any reason, as in starting, the trigger circuits should exist out of the desired synchronism so that the predetermined sequence of output signals could not be produced, these corrective circuits will cause the return of certain trigger circuits to known reference conditions and render them in proper condition for correct succeeding operation. The actual interconnection of the corrective circuits and the polarity of signals employed will be given and explained in considerable detail at a later point in this discussion. It is to be understood, however, that the corrective signal paths herein shown and described may be replaced by a group of manually or automatically operated reset switches.

Figure 2:
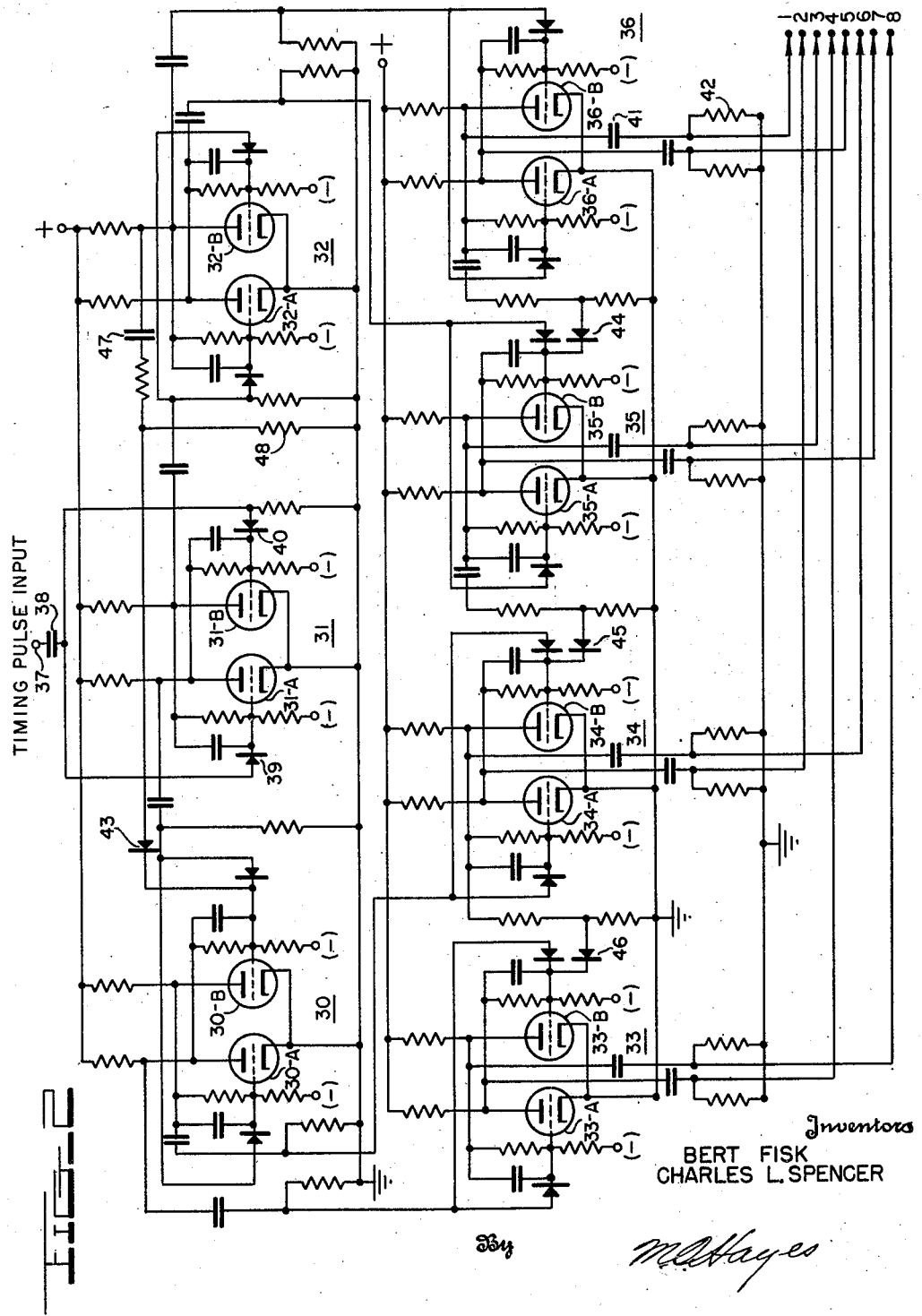
Fig. 2 is a schematic diagram of a typical embodiment of the features of the present invention.

With particular reference now to the schematic diagram of Fig. 2 details of the trigger circuits and their inter-connections are shown. Timing pulses from the pulse generator 10 or other suitable pulse source to be commutated are applied to terminal 37. To obtain reliable operation with input pulses of widely varying characteristics it has been found desirable although not necessary to provide pulse shaping circuits such as that including capacitance 38 which will differentiate input pulses to provide alternate negative and positive pulses of short duration from each pulse supplied to terminal 37. The first trigger circuit is 31 corresponding to that numbered 11 in Fig. 1 and contains the triode type electron tubes 31A and 31B. These electron tubes are connected in a familiar Eccles-Jordan trigger circuit to the grids of which are supplied trigger pulses through uni-lateral impedance elements 39 and 40. The purpose of the unilateral impedance elements 39 and 40 is to suppress any positive pulses which may appear in the output from the differentiator circuit of capacitance 38. Thus it is seen that upon occurrence of each negative differentiated pulse the conductive tube, whichever it may be, of the trigger circuit 31 will be cut off to effect trigger operation thereof.

Connected to the anode of tube 31A similarly through a differentiating coupling circuit and uni-lateral impedance elements is a second trigger circuit corresponding to circuit 12A of Fig. 1 having the tubes 30A and 30B. As shown, the trigger circuit 30 may be identical to trigger circuit 31. By virtue of a differentiating coupling circuit therein, and uni-lateral impedance elements, trigger action of the trigger circuit 30 will result only upon the initiation of conduction in tube 31A, and not upon termination of conduction therein.

In like manner, a third trigger circuit 32 having tubes 32A and 32B is connected through a differentiator type coupling circuit and unilateral impedance elements to the anode of tube 31B. Construction of this trigger circuit 32 is identical to those previously described. Thus each time conduction is initiated in tube 31B, trigger action of the circuit 32 will occur. Similarly the additional trigger circuits 33, 34, 35, 36 correspond to the trigger circuits of the third group 13A, 13B, 13C and 13D, respectively, of Fig. 1. The grids of the tubes 33A and 33B are connected through uni-lateral impedance elements and differentiator type coupling circuits to the anode of tube 30A, the grids of tubes 34A and 34B are connected through uni-lateral impedance elements and a differentiator type coupling circuit to the anode of tube 30B, the grids of tubes 35A and 35B are connected through unilateral impedance elements and a differentiator type coupling circuit to the anode of tube 32A and the grids of tubes 36A and 36B are connected through uni-lateral impedance elements and a differentiator type coupling circuit to the anode of tube 32B.

Output signals from the unit are realized at the terminals numbered 1 through 8. These output terminals are connected to anodes of the third group of trigger circuits as through differentiating coupling circuits shown to provide short duration pulse type signals upon occurrence of a change in the conductivity condition in the trigger circuits. As connections are made to both anodes of the trigger circuit tubes, both positive and negative signals are obtained in the output circuits, for example at the same time a negative pulse is produced at terminal 1, a positive pulse is produced at terminal 5, and each time a negative pulse is produced at terminal 5 a positive pulse is produced at terminal 1. This action offers no serious difficulty however because the inclusion of uni-lateral impedance elements or biased tubes in the circuits at the utilization equipment, polarized to deliver either a positive or negative pulse as desired will remove pulses of unwanted polarity.

In operation with input pulses supplied to terminal 37, output pulses will be produced in numerical sequence at each of the terminals 1 through 8 every 8 milli-seconds. Thus a negative pulse will appear at terminal 2 one milli-second after a negative pulse at terminal 1, at terminal 3, one milli-second later, at terminal 4 another milli-second later and so on. A high degree of stability of operation is assured by virtue of the fact that at no point in the circuit is employed a delicately adjusted clipping tube with mixing circuits to realize output signals upon various combinations of conductivity conditions.

The corrective signal paths previously mentioned in connection with Fig. 1 are indicated by those including elements numbered 43, 44, 45, 46, 47 and 48. Elements 47 and 48 comprise a typical short time-constant differentiating circuit such as is found in all corrective signal paths. The uni-lateral impedance elements characterized by the numerals 43 through 46 further identify the signal paths. In normal operation for example, each time a typical tube 32B is rendered conductive a negative signal is supplied through capacitance 47 and uni-lateral impedance element 43 to the grid of tube 30B. If at this instant tube 30B is non-conductive this signal will be completely ineffective. On the other hand if tube 30B is conductive it will be cut off placing the trigger circuit in condition with tube 30A conducting. It is therefore seen that the trigger circuits as set up require conduction in tube 30A whenever tube 32B becomes conductive or reset will take place. Similarly the grid of tube 35B is connected to the anode of tube 36B through uni-lateral impedance element 44, the grid of tube 34B to the anode of tube 35B through unilateral impedance element 45, and the grid of tube 33B to the anode of tube 34B through unilateral impedance element 46. It is therefore seen that tube 35A must be conductive each time conduction is initiated in tube 36B, tube 34A conductive each time conduction is initiated in tube 35B, and tube 33A each time conduction is initated in tube 34B. To illustrate operation first with all trigger circuits in a correct combination of conductivity conditions the following tubes may be assumed conductive: 31A, 30A, 32A, 33B, 34B, 35A, 36A.

A first negative pulse applied through capacitance 38 will therefore cut off tube 31A bringing tube 31B to conduction. The initiation of conduction in tube 31B will apply a negative signal to the conductive tube 32A causing triggering of circuit 32 producing thereby a negative signal at the anode of tube 32B which is effective to interrupt conduction in tube 36A. Thus tube 36B is brought to conduction, tube 36A cut off. For the present discussion it is assumed that the utilization circuits connected to the terminals 1 through 8 are responsive only to negative signals rendered thus as previously described. Thus only the negative signals appearing as by differentiation in short time constant circuits such as the one including capacitance 41 and resistance 42 will be "seen" by the connected equipment. It is to be noted, however, that simultaneous with the production of this negative signal at terminal 1, a positive signal is produced at terminal 5 which may be utilized if desired.

Operation of trigger circuit 31 resultant to this first input signal is ineffectual for operating trigger circuit 30 because the signal produced thereby at the anode of tube 31A is positive. Thus following the application of this first signal the trigger circuits are left in condition with the following tubes conducting: 31B, 30A, 32B, 33B, 34B, 35A, 36B.

To illustrate operation of the circuit in correct sequence as well as the operation of the corrective circuits themselves a series of twenty-five complete cycles of operation has been shown in tabular form in Fig. 3. A starting condition has been chosen in which all of the right hand tubes B are conductive. To assist in the follow through of the operation of the circuits the guide lines at the head of Fig. 3 have been included. Above the column heading 31 which indicates the condition of trigger circuit 31 the letters A and B lead to the columns headed 30 and 32, respectively, indicating the conditions of the trigger circuits of the same number. The information given by these lines shows that each time conduction is initiated in the A section of trigger circuit 31, trigger circuit 30 will change from its previously existing condition and each time the B conductive condition is achieved in trigger circuit 31 the trigger circuit 32 will operate.

Similarly lines connecting columns 33 and 34 to column 30 indicate that each time conduction is initiated in the A tube of trigger circuit 30, trigger circuit 33 will change its conductivity condition and each time conduction is initiated in the B tube of trigger circuit 30, trigger circuit 34 will change its conductivity condition. The inter-connection of the columns 35, 36 to column 32 is similarly intended to indicate that each time conduction is initiated in the A tube of trigger circuit 32, trigger circuit 35 will be operated and each time conduction is initiated in the B tube of trigger circuit 32, trigger circuit 36 will be operated. Conduction in the B tube (right hand) of a trigger circuit is indicated in the table of Fig. 3 by the letter B whereas conduction in the A (left hand) tube of the trigger circuit is indicated by the letter A.

The previously indicated starting conditions wherein conduction is present in all right hand tubes is given in the first horizontal line opposite the word "Start." To illustrate then how operation proceeds through the trigger circuits of the commutator a first negative pulse applied to circuit 31 will bring it to a condition wherein the left hand tube A is conductive. Initiation of conduction in 31A operates trigger circuit 30 to bring it to the A conductive condition and subsequently bring circuit 33 to its A conductive condition as indicated in the horizontal line No. 1.

Similar action occurs for a second input pulse to the trigger circuit 31 bringing that particular circuit to conduction in the B section. With conduction thus initiated in the B section, trigger circuit 32 is operated to initiate conduction in the A section thereof. As conduction is initiated in the A section of trigger circuit 32, trigger circut 35 is operated to bring about the existence of the A condition therein. This type of action proceeds through the trigger circuits of the commutator upon application of succeeding pulses.

The operation of the corrective circuits is indicated in some of the lines corresponding to the pulses Nos. 4 through 13. For example pulse No. 4 initiates conduction in the B section of circuit 31 to operate trigger circuit 32 establishing the B condition therein. As the B condition is established in trigger circuit 32 the previously existing B condition in trigger circuit 30 presents a situation wherein a negative pulse delivered through uni-lateral impedance element 43 is effective to operate trigger circuit 30. Trigger circuit 30 is thus brought to a conditon wherein conduction in the A section exists. With operation of both trigger circuits 30 and 32, two trigger circuits of the third group, namely circuits 33 and 36, will operate bringing 36 to the A condition and 33 to the B condition as indicated. The condition A for circuit 30 and B for circuit 33 are circled in Fig. 3 to indicate that they are conditions brought about as a result of the operation of the reset circuits. For the balance of the signals through No. 13, reset of circuit 33 takes place whenever it is in the B condition at the time of iniation of the B condition in circuit 34. Reset action also takes place whenever the B condition in circuit 34 is existent at the time of initiation of the B condition in circuit 35. Reset in circuit 35 similarly takes place when an existing B condition therein is accompanied by the initiation of the B condition in circuit 36. The reset of these circuits one by the other as well as of circuit 30 by circuit 32 is indicated by the curved arrows at the heading of Fig. 3.

After the thirteenth signal it will be noted from Fig. 3 that no more resets take place, only one of the third group of trigger circuits 33, 34, 35, 36 experiencing operation resultant to each input pulse.

The fourteenth pulse is accompanied by the initiation of conduction in the A section of circuit 35 which produces a negative output pulse at terminal 7. The fifteenth pulse in turn initiates conduction in the B section of trigger circuit 33 producing a negative output pulse at terminal 8. Pulse No. 16 initiates conduction in the B section of trigger circuit 36 producing a negative output pulse at terminal 1. Pulse No. 17 initiates conduction in the A section of trigger circuit 34 producing a negative output signal at terminal 2. This same action continues throughout the trigger circuits with pulse No. 18 producing a negative output signal at terminal 3, No. 19 at terminal 4, No. 20 at terminal 5, No. 21 at terminal 6, No. 22 at terminal 7 and so on in repetitive numerical sequence.

It is therefore seen that a commutator circuit possessing a novel form of inter-connection between component trigger circuits has now been made available to the art. This circuit possesses a high degree of stability since it does not require combining circuits and delicately adjusted biased clipping tubes.

Although certain specific embodiments of this invention have been herein disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. An electronic commutation circuit for distributing the signals of an input signal source comprising, a plurality of trigger circuits each having two stable conductivity states, a primary signal path connecting a first one of the trigger circuits to the input signal source to provide trigger signals therefor, secondary signal paths connecting the remaining trigger circuits in successive groups each group having twice as many trigger circuits as a preceding group with two circuits of each group alternately responsive to operation of a single circuit of a preceding group, and separate reset signal paths connecting an output of each trigger circuit except one in a group to an input of another trigger circuit in the same group to establish a selected sequence of operation of the circuits in each group.

2. An electronic commutation circuit for distributing the signals of an input signal source comprising, a plurality of trigger circuits having two stable conductivity states, a primary signal path connecting a first one of the trigger circuits to the input signal source to provide trigger signals therefor, secondary signal paths connecting the remaining trigger circuits in successive groups, each group having twice as many trigger circuits as a preceding group with two circuits of each group alternately responsive to operation of a single circuit of a preceding group, a plurality of output circuits connected to the circuits of the last group for providing sequential output signals, and separate reset signal paths connecting an output of each trigger circuit except one in a group to an input of another trigger circuit in the same group to establish a selected sequence of operation of the circuits in each group.

3. An electronic commutation circuit for distributing the signals of an input signal source, comprising a plurality of trigger circuits each having two state stability and two output lines, each circuit responsive to input pulses of selected polarity to alternately produce two separate output signals in the two lines, a first signal path connecting the input signal source and a first one of the trigger circuits to establish operation of the latter, a plurality of secondary signal paths connecting the remaining trigger circuits in a geometrically progressive configuration of groups of circuits one to each of the output lines from a preceding circuit, and separate reset signal paths connecting an output of each trigger circuit except one in a group to an input of another trigger circuit in the same group to establish a selected sequence of operation of the circuits in each group.

4. An electronic commutation circuit comprising a plurality of dual stability trigger circuits each having an input connection thereto and a pair of output terminals providing output signals in alternation as the trigger circuit changes states, means connecting said circuits in successive groups each group having twice the number of trigger circuits as a preceding group, said last named means including separate connections leading from the respective outputs of each circuit in the groups to the inputs of separate pairs of circuits in a succeeding group, and separate reset signal paths connecting an output of each trigger circuit except one in a group to an input of another trigger circuit in the same group to establish a selected sequence of operation of the circuits in each group.

BERT FISK.
CHARLES L. SPENCER.

REFERENCES CITED

The following references are of record in the file of this patent:

UNITED STATES PATENTS

| Number | Name | Date |
| --- | --- | --- |
| 2,258,943 | Bedford | Oct. 14, 1941 |
| 2,417,522 | Shenk | Mar. 18, 1947 |
| 2,424,481 | McCoy | July 22, 1947 |